US010045478B2

United States Patent
Posselius

(10) Patent No.: US 10,045,478 B2
(45) Date of Patent: Aug. 14, 2018

(54) METERING SYSTEM FOR AN AGRICULTURAL SYSTEM

(71) Applicant: CNH Industrial America LLC, New Holland, PA (US)

(72) Inventor: John Henry Posselius, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 13 days.

(21) Appl. No.: 15/214,242

(22) Filed: Jul. 19, 2016

(65) Prior Publication Data

US 2018/0020608 A1     Jan. 25, 2018

(51) Int. Cl.
| | |
|---|---|
| *A01C 7/20* | (2006.01) |
| *A01C 11/02* | (2006.01) |
| *A01C 7/04* | (2006.01) |
| *A01C 7/08* | (2006.01) |
| *A01C 15/00* | (2006.01) |
| *A01C 7/10* | (2006.01) |

(52) U.S. Cl.
CPC .............. *A01C 7/042* (2013.01); *A01C 7/081* (2013.01); *A01C 7/082* (2013.01); *A01C 7/102* (2013.01); *A01C 11/02* (2013.01); *A01C 15/00* (2013.01)

(58) Field of Classification Search
CPC ........... A01C 7/04; A01C 7/081; A01C 7/082; A01C 7/102; A01C 11/02
USPC .............. 198/624, 608, 663, 369.6; 222/281, 222/412–414; 111/104, 105, 173–176
See application file for complete search history.

(56) References Cited

U.S. PATENT DOCUMENTS

| | | | | |
|---|---|---|---|---|
| 3,912,122 A | * | 10/1975 | Knapp | ............... A01C 7/04 111/135 |
| 3,913,798 A | * | 10/1975 | Allen | ............... A01C 7/04 111/178 |
| 4,130,072 A | | 12/1978 | Dedolph | |

(Continued)

FOREIGN PATENT DOCUMENTS

| | | |
|---|---|---|
| CN | 102173959 A | 9/2011 |
| CN | 202068781 U | 12/2011 |

(Continued)

OTHER PUBLICATIONS

Mauromicale, G. et al., Planning of Globe Artichoke Plantlets Production in Nursery, Acta Horticulturae, Jan. 2005, pp. 279-284, https://www.researchgate.net/publication/282643767.

(Continued)

*Primary Examiner* — John Weiss
(74) *Attorney, Agent, or Firm* — Rebecca L. Henkel; Rickard K. DeMille

(57) ABSTRACT

A metering system for an agricultural system includes a singulator. The singulator includes a hopper configured to provide a flow of plantlet casings from a storage tank of the agricultural system, a pair of counter-rotating rods configured to receive the plantlet casings from the hopper at a feed rate, where the pair of counter-rotating rods are spaced apart from one another to form a gap, and where the gap is configured to direct the plantlet casings from a first end of the pair of counter-rotating rods to a second end of the pair of counter-rotating rods, and a drive assembly configured to drive rotation of the pair of counter-rotating rods.

20 Claims, 5 Drawing Sheets

(56) References Cited

U.S. PATENT DOCUMENTS

| | | | |
|---|---|---|---|
| 4,254,898 A * | 3/1981 | Davis | G01F 11/003 222/263 |
| 4,717,026 A * | 1/1988 | Fischer | B07C 5/02 194/205 |
| 4,788,920 A | 12/1988 | Shaw | |
| 4,998,945 A | 3/1991 | Holt et al. | |
| 5,119,588 A | 6/1992 | Timmis et al. | |
| 5,881,655 A | 3/1999 | Edmonds et al. | |
| 7,168,375 B2 | 1/2007 | Huang | |
| 7,258,070 B2 | 8/2007 | Mayerle | |
| 7,665,243 B2 | 2/2010 | Nehra et al. | |
| 7,861,845 B1 * | 1/2011 | Lapointe | B65G 65/466 198/383 |
| 7,923,249 B2 | 4/2011 | Rise et al. | |
| 8,234,987 B2 | 8/2012 | Georgison et al. | |
| 8,326,500 B2 | 12/2012 | Mariman et al. | |
| 8,452,445 B2 * | 5/2013 | Becker | B07C 5/3425 209/3.3 |
| 8,666,608 B2 * | 3/2014 | Friggstad | A01B 79/005 111/173 |
| 8,746,158 B2 * | 6/2014 | Binsirawanich | G01F 1/74 111/174 |
| 2012/0031315 A1 | 2/2012 | Beaujot | |
| 2013/0174483 A1 | 7/2013 | Caspar et al. | |
| 2013/0180173 A1 | 7/2013 | Caspar et al. | |

FOREIGN PATENT DOCUMENTS

| | | |
|---|---|---|
| EP | 0232628 A1 | 8/1987 |
| EP | 1829446 A2 | 9/2007 |
| NL | 1018273 C2 | 12/2002 |
| WO | 9100167 A1 | 1/1991 |

OTHER PUBLICATIONS

Reed, David Wm., Cloning Plants: Tissue Culture, Horticulture and the Science of Plants, Youth Adventure Program, Oct. 14, 2013, pp. 1-5, http://hort201.tamu.edu/YouthAdventureProgram/TissueCulture/TissueCulture.html.

* cited by examiner

```
┌─────────────────────────────────────────┐
│ RECEIVE INPUTS INDICATIVE OF A TARGET FLOW RATE │──172
│      OF PLANTLET CASINGS TO SOIL        │
└─────────────────────────────────────────┘
                    │
                    ▼
┌─────────────────────────────────────────┐
│ RECEIVE FEEDBACK INDICATIVE OF ONE OR BOTH OF A │──174
│ MEASURED VIBRATION FREQUENCY OF A HOPPER AND    │
│ A MEASURED AIR FLOW RATE THROUGH A CONDUIT      │
└─────────────────────────────────────────┘
                    │
                    ▼
┌─────────────────────────────────────────┐
│ DETERMINE A MEASURED ROTATION SPEED OF ONE OR │──176
│    MORE PAIRS OF COUNTER-ROTATING RODS        │
└─────────────────────────────────────────┘
                    │
                    ▼
┌─────────────────────────────────────────┐
│ DETERMINE ONE OR MORE OF A SET POINT VIBRATION  │
│ FREQUENCY OF THE HOPPER, A SET POINT FLOW RATE  │
│  OF AIR THROUGH THE CONDUIT, AND A SET POINT    │──178
│  ROTATION SPEED OF THE ONE OR MORE PAIRS OF     │
│  COUNTER-ROTATING RODS BASED ON THE TARGET      │
│    FLOW RATE OF PLANTLET CASINGS TO SOIL        │
└─────────────────────────────────────────┘
                    │
                    ▼
┌─────────────────────────────────────────┐
│ ADJUST ONE OR MORE OF THE VIBRATION FREQUENCY   │
│  OF THE HOPPER, THE FLOW RATE OF AIR THROUGH    │
│ THE CONDUIT, AND THE ROTATION SPEED OF THE ONE  │
│ OR MORE PAIRS OF COUNTER-ROTATING RODS BASED    │──180
│   ON THE SET POINT VIBRATION FREQUENCY OF THE   │
│ HOPPER, THE SET POINT FLOW RATE OF AIR THROUGH  │
│  THE CONDUIT, THE SET POINT ROTATION SPEED OF THE│
│   ONE OR MORE PAIRS OF COUNTER-ROTATING RODS,   │
│           OR A COMBINATION THEREOF              │
└─────────────────────────────────────────┘
```

FIG. 5

METERING SYSTEM FOR AN AGRICULTURAL SYSTEM

BACKGROUND

The present disclosure relates generally to a metering system for an agricultural system, and more particularly to a metering system for plantlet casings.

Generally, seeding implements (e.g., seeders, planters) are towed behind or semi-mounted on a tractor or other work vehicle via a mounting bracket secured to a rigid frame of the implement. Seeding implements typically include multiple row units distributed across a width of the implement. Each row unit is configured to deposit seeds at a desired depth beneath the soil surface of a field, thereby establishing rows of planted seeds. For example, each row unit typically includes a ground engaging tool or opener that forms a seeding path (e.g., trench) for seed deposition into the soil. A seed tube (e.g., coupled to the opener) is configured to deposit seeds and/or other agricultural products (e.g., fertilizer) into the trench. The opener/seed tube is followed by closing discs that move displaced soil back into the trench and/or a packer wheel that packs the soil on top of the deposited seeds.

In certain agricultural system configurations, an air cart is used to meter and deliver agricultural product (e.g., seeds, fertilizer, etc.) to the row units of the seeding implement. The air cart generally includes a storage tank (e.g., a pressurized tank), an air source (e.g., a blower), and a metering system. The agricultural product is typically gravity fed from the storage tank to the metering system, which distributes a desired volume of agricultural product into an air flow generated by the air source. The air flow carries the product to the row units via conduits extending between the air cart and the seeding implement. The metering system typically includes meter rollers that regulate the flow of product based on meter roller geometry and rotation rate. Unfortunately, typical meter rollers may not be effective at metering casings that include plantlets from the storage tank to the row units. For example, plantlets may be disposed in casings (e.g., plantlet casings), which may not flow through typical metering systems.

BRIEF DESCRIPTION

In one embodiment, a metering system for an agricultural system includes a singulator. The singulator includes a hopper configured to provide a flow of plantlet casings from a storage tank of the agricultural system, a pair of counter-rotating rods configured to receive the plantlet casings from the hopper at a feed rate, where the pair of counter-rotating rods are spaced apart from one another to form a gap, and where the gap is configured to direct the plantlet casings from a first end of the pair of counter-rotating rods to a second end of the pair of counter-rotating rods, and a drive assembly configured to drive rotation of the pair of counter-rotating rods.

In another embodiment, a metering system for an agricultural system includes a singulator and an inductor. The singulator includes a pair of counter-rotating rods configured to receive plantlet casings from a storage tank of the agricultural system at a feed rate, where the pair of counter-rotating rods are spaced apart from one another to form a gap, and where the gap is configured to direct the plantlet casings from a first end of the pair of counter-rotating rods to a second end of the pair of counter-rotating rods, and a drive assembly configured to drive rotation of the pair of counter-rotating rods. The inductor includes a receiving portion configured to receive the plantlet casings from the second end of the counter-rotating rods of the singulator, a conduit coupled to the receiving portion and configured to receive the plantlet casings from the receiving portion, where the conduit is configured to convey the plantlet casings to at least one row unit, and an air source fluidly coupled to the conduit and configured to provide an air flow through the conduit to convey the plantlet casings to the at least one row unit.

In another embodiment, a metering system for an agricultural system includes a singulator. The singulator includes a plurality of pairs of counter-rotating rods configured to receive plantlet casings from a storage tank of the agricultural system at a feed rate, where each pair of counter-rotating rods of the plurality of pairs of counter-rotating rods is spaced apart from one another to form a gap, and where the gap is configured to direct the plantlet casings from a first end of the plurality of pairs of counter-rotating rods to a second end of the plurality of pairs of counter-rotating rods, and a drive assembly configured to drive rotation of at least one pair of counter-rotating rods of the plurality of pairs of counter-rotating rods.

DRAWINGS

These and other features, aspects, and advantages of the present disclosure will become better understood when the following detailed description is read with reference to the accompanying drawings in which like characters represent like parts throughout the drawings, wherein:

FIG. 5 is a flow chart of an embodiment of a process that may be used to adjust a speed of the singulator of FIG. 3, in accordance with an aspect of the present disclosure.

DETAILED DESCRIPTION

Figure 1:
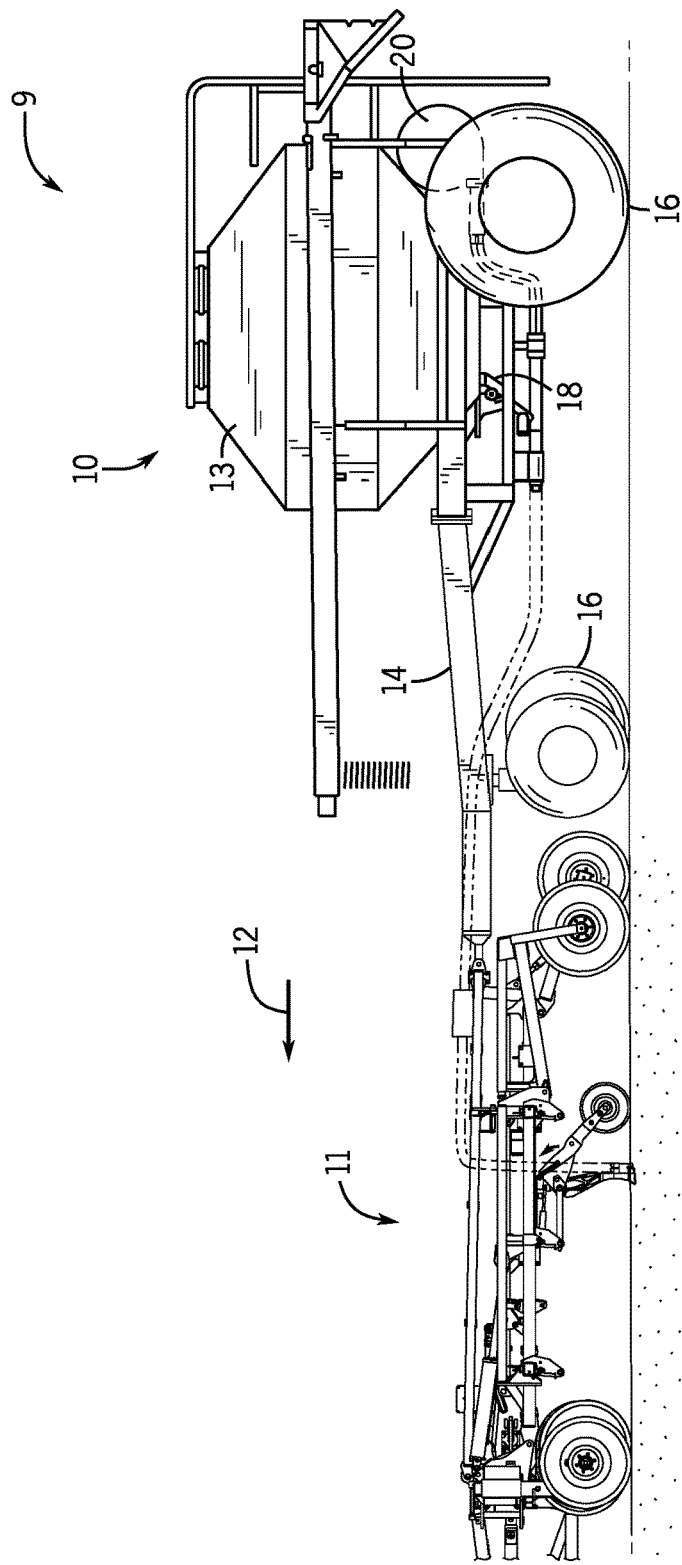
FIG. 1 is a side view of an embodiment of an air cart, including a metering system configured to regulate a flow of plantlet casings, in accordance with an aspect of the present disclosure.

The embodiments disclosed herein relate to an improved metering system that is configured to meter plantlets enclosed in casings. For example, it may be desirable to dispose plantlets into the ground to produce certain types of agricultural products (e.g., agricultural products that are difficult to grow using seeds). As used herein, "plantlets" refer to partially grown plants (e.g., plants that have not fully matured). Plantlets may be grown in a greenhouse, garden, laboratory, or another preliminary growing location and transported to a commercial farm where more space is available to produce a large quantity of the mature plants. In order to facilitate, storage, transportation, and disposal of the plantlets into the ground (e.g., soil), the plantlets may be enclosed in casings. In some embodiments, the plantlet casings may include an inverted frustum-shape (e.g., cone-shape) and have a greater weight at a first end (e.g., a narrower end) as compared to a second end (e.g., a wider end) to facilitate disposing the plantlet casings into the ground. For example, the plantlet, soil, fertilizer, water, other organic material, or a combination thereof, may be disposed in the first end (e.g., the narrower end). Additionally, the first end of the inverted frustum-shape may have a first diameter smaller than a second diameter of the second end. Accordingly, the plantlet casings may be substantially self-orienting (e.g., with the first end down and the second end up) to ensure that the plantlet is properly oriented in the ground. In other embodiments, the plantlet casings may include any other suitable shape (e.g., spherical, polygonal, or another shape configured to facilitate storage, transport, and planting of the plantlet). In accordance with embodiments of the present disclosure, the plantlet casings are configured to be disposed into a furrow that may be formed by openers of traditional seeders. The plantlet casings may be biodegradable, such that over time, the plantlets may be exposed to the surrounding soil, such that the plantlets may grow into mature plants.

Unfortunately, typical air carts are intended to handle seed particles, which are relatively small when compared to the plantlet casings. Therefore, typical air carts may not be configured to meter plantlet casings effectively. It is now recognized that an improved metering system is desired to convey a large quantity of the plantlet casings to row units to facilitate depositing the plantlet casings into the ground.

Embodiments of the present disclosure relate to a metering system that includes a singulator and/or an inductor assembly that are configured to convey the plantlet casings from a storage tank to row units of a seeder. The singulator may include one or more pairs of counter-rotating rods that direct the plantlet casings from an outlet of the storage tank (e.g., a hopper) to an inlet (e.g., opening) of one or more inductors of the inductor assembly. In some cases, the one or more pairs of counter-rotating rods may be positioned at a downward sloping angle with respect to the ground to use gravity, in addition to the counter-rotation of the rods, to singulate and convey the plantlet casings. In any case, the counter-rotation of the rods may singulate and direct the plantlet casings toward the one or more inductors at a selected rate. The selected rate may be adjusted based on a vibration frequency of the hopper and/or a speed of an air source that is configured to convey the plantlet casings through the inductor assembly toward the row units. For example, the selected rate, the vibration frequency of the hopper, and/or the speed of the air source may be set based on a target flow rate of the plantlet casings through the metering system. In some embodiments, the selected rate may be adjusted by controlling an amount of power supplied to the one or more pairs of counter-rotating rods using a drive assembly. The amount of power supplied to the one or more pairs of counter-rotating rods may be proportional to the rotation speed of the one or more pairs of counter-rotating rods. Accordingly, the drive assembly may be attached to the one or more pairs of counter-rotating rods and to a controller (e.g., a variable frequency drive) to control an amount of power supplied to the one or more pairs of counter-rotating rods, and thus, the speed of the one or more pairs of counter-rotating rods.

When the plantlet casings reach an end of each pair of counter-rotating rods, the plantlet casings move into an inductor of the inductor assembly. Each inductor of the inductor assembly may include an inlet (e.g., opening) having a funnel-shape to facilitate receiving the plantlet casings into the inductor. The inductor may convey the plantlet casings toward a respective row unit or group of row units via an air flow generated from an air source. In some embodiments, each inductor of the inductor assembly may include a physical feature (e.g., a portion of the conduit having a smaller diameter, a check valve, or another suitable feature) that blocks movement of the inverted frustum-shaped casings toward the air source. The inductor may include an opening having a diameter sufficiently large to accommodate a size of the plantlet casings and any variations between sizes of the plantlet casings due to engineering and/or manufacturing tolerances. Accordingly, each inductor of the inductor assembly may direct the plantlet casings to the respective row unit or group of row units, such that the plantlet casings may be disposed in the ground to ultimately grow into mature plants.

To help illustrate the manner in which the present embodiments may be used in a system, FIG. 1 is a side view of an agricultural system 9 that includes an air cart 10, which may be used in conjunction with a towable agricultural implement 11 to deposit plantlets enclosed in casings (e.g., plantlet casings) into the soil. As used herein, the agricultural system 9 refers to a system that includes the air cart, the agricultural implement, a work vehicle, or a combination thereof. Certain agricultural implements include row units that may be configured to open the soil (e.g., via a planter shoe, a double disc opener, a hoe opener, or the like), dispense plantlet casings into the soil opening, and re-close the soil. Such implements 11 are generally coupled to a tow vehicle, such as a tractor, and pulled through a field. In accordance with embodiments of the present disclosure, plantlet casings are conveyed to the row units by the illustrated air cart 10, which is generally towed in sequence with the implement along a direction of travel 12. In certain configurations, the air cart 10 may be configured to provide a combination of plantlet casings and fertilizer.

In the illustrated embodiment, the air cart 10 includes a storage tank 13, a frame 14, wheels 16, a metering system 18, and an air source 20. In certain configurations, the storage tank 13 includes multiple compartments for storing various flowable particulate materials (e.g., the plantlet casings, fertilizer, etc.). For example, one compartment may include the plantlet casings, which may include sugar cane plantlets, willow plantlets, poplar plantlets, grape plantlets, miscanthus plantlets, potato plantlets, rhizome-based plantlets, among others, and another compartment may include a fertilizer. In such configurations, the air cart 10 is configured to deliver both the plantlet casings and fertilizer to the implement (e.g., row units of the implement). The frame 14 includes a towing hitch configured to couple to the implement or tow vehicle. As discussed in detail below, plantlet casings and/or fertilizer within the storage tank 13 are gravity fed into the metering system 18 (e.g., via a hopper). In some embodiments, the metering system 18 includes a singulator that regulates the flow of material (e.g., plantlet casings, fertilizer, etc.) from the storage tank 13 into an inductor assembly that directs material to the implement (e.g., row units of the implement) via air flow provided by the air source 20. For example, the air flow carries the material (e.g., plantlet casings, fertilizer, etc.) to the implement in pneumatic conduits. In this manner, the row units receive a supply of plantlet casings and/or fertilizer for deposition into the soil.

Figure 2:
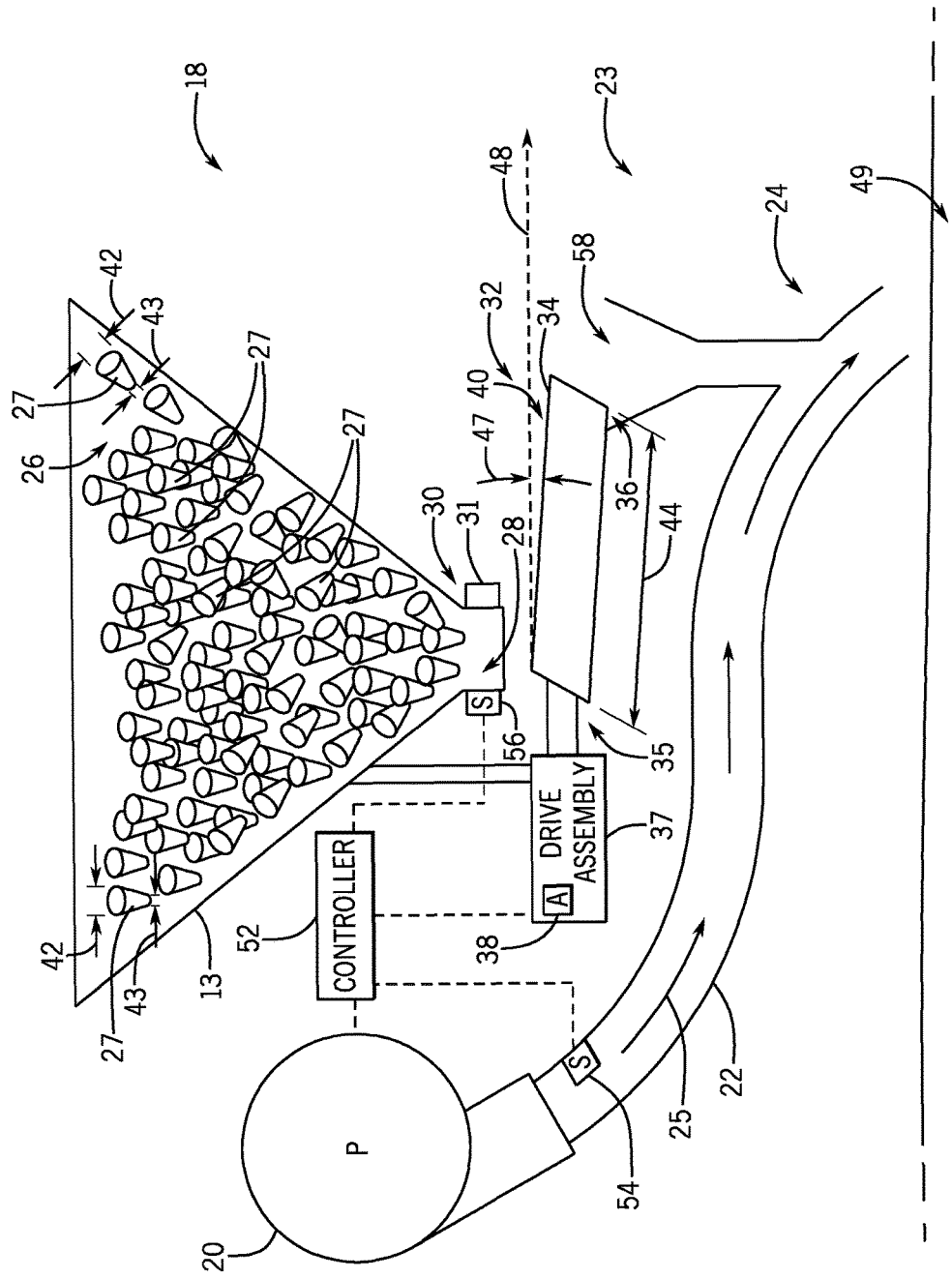
FIG. 2 is a schematic view of an embodiment of a metering system that may be employed within the air cart of FIG. 1, in accordance with an aspect of the present disclosure.
Figure 3:
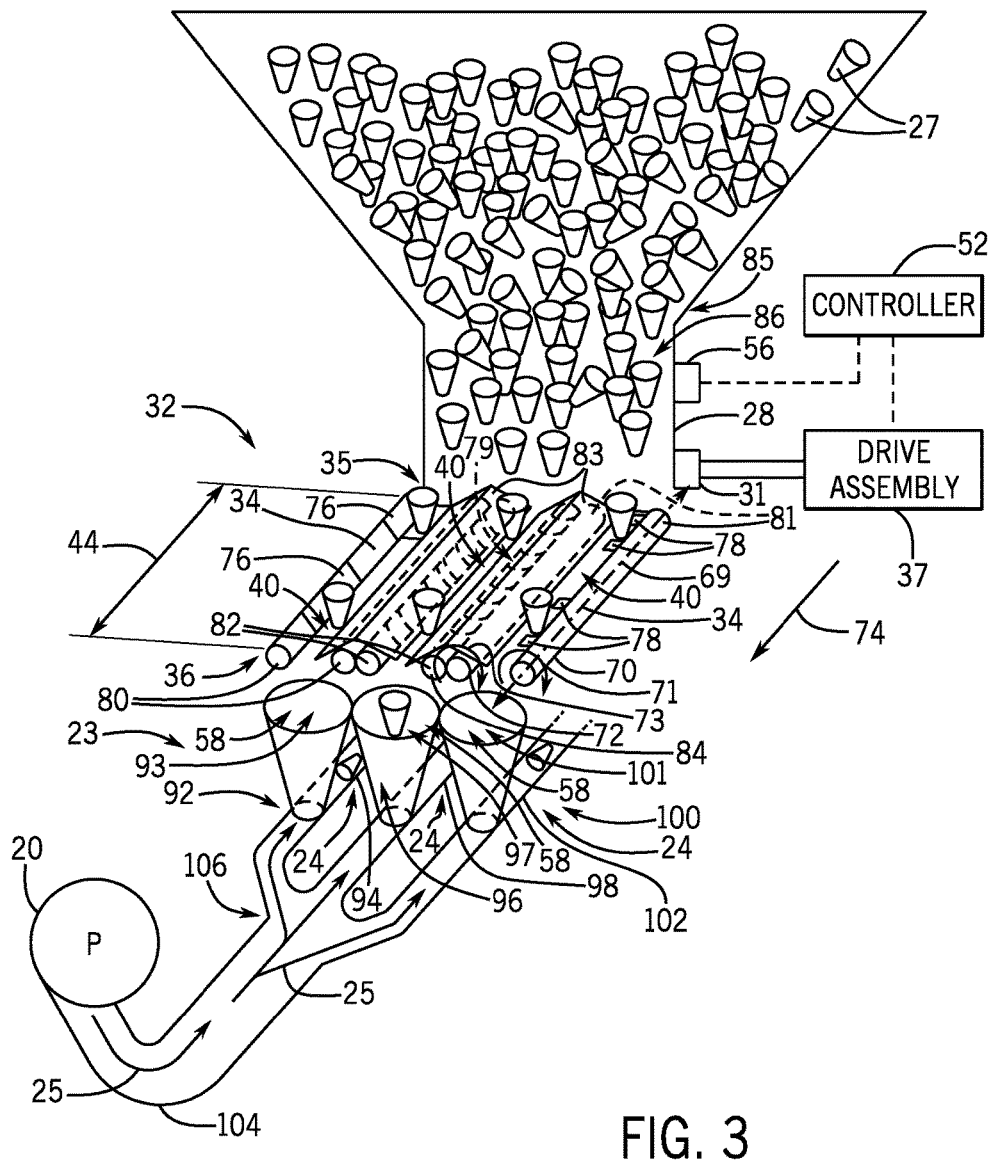
FIG. 3 is a perspective view of an embodiment of a singulator of the metering system of FIG. 2, in accordance with an aspect of the present disclosure.

FIG. 2 is a schematic view of the metering system 18 of FIG. 1, in accordance with an aspect of the present disclosure. As illustrated, the air source 20 is fluidly coupled to a conduit 22 of an inductor assembly 23 that includes one or more inductors 24. The conduit 22 is configured to flow air 25 through the inductor assembly 23. The air source 20 may be a pump or blower powered by an electric or hydraulic motor, for example. Flowable particulate material 26 (e.g., plantlet casings 27, etc.) within the storage tank 13 flows by gravity into the metering system 18. In the illustrated embodiment of FIG. 2, the storage tank 13 includes a hopper 28 at an outlet 30 of the storage tank 13. The hopper 28 may be configured to vibrate, such that material in the storage tank 13 shifts and falls from the outlet 30 of the storage tank 13 to the metering system 18 at a substantially constant rate. For example, the hopper 28 may include a shaker 31 configured to vibrate the hopper 28 and shift the plantlet casings 27, such that the plantlet casings 27 fall from the storage tank 13. Additionally or alternatively, the storage tank 13 may be pressurized such that a static pressure in the storage tank 13 is greater than a static pressure in the conduit 22, thereby facilitating an even flow of material through the metering system 18. The metering system 18 includes a singulator 32 and the inductor assembly 23.

In some embodiments, the singulator 32 may include one or more pairs of counter-rotating rods 34. The one or more pairs of counter-rotating rods 34 are configured to singulate and direct the material (e.g., plantlet casings and/or fertilizer) from the storage tank 13 to the inductor assembly 23. For example, a first end 35 of the one or more pairs of counter-rotating rods 34 may receive the material 26 from the storage tank 13 (or the hopper 28) and a second end 36 of the one or more pairs of counter-rotating rods 34 may direct the material 26 toward the inductors 24 of the inductor assembly 23. In some embodiments, each pair of the one or more pairs of counter-rotating rods 34 may be associated with a respective inductor 24 of the inductor assembly 23.

In the illustrated embodiment, the one or more pairs of counter-rotating rods 34 are coupled to a drive assembly 37, which is configured to rotate the one or more pairs of counter-rotating rods 34 (e.g., in both clockwise and counterclockwise directions). In certain embodiments, the drive assembly 37 may include an actuator 38, such as an electric or hydraulic motor, configured to drive the one or more pairs of counter-rotating rods 34 to rotate. In further embodiments, the drive assembly 37 may be coupled to one or more of the wheels 16 (e.g., via a gear assembly) such that rotation of the wheels 16 drives the one or more pairs of counter-rotating rods 34 to rotate. Such a configuration automatically varies the rotation rate of the one or more pairs of counter-rotating rods 34 based on a speed of the air cart 10. In still further embodiments, the drive assembly 37 may drive the one or more pairs of counter-rotating rods 34 to rotate at different speeds (e.g., each pair of the one or more pairs of counter-rotating rods 34 rotates at a speed independent of the remaining one or more pairs of counter-rotating rods 34) based on a target flow rate of a respective row unit or group of row units. Additionally, in some embodiments, the drive assembly 37 may be configured to supply power to the air source 20.

A gap 40 is positioned between each pair of counter-rotating rods 34. Accordingly, the material exiting the hopper 28 (and the storage tank 13) may fall into the gap 40 between each pair of counter-rotating rods 34. In some embodiments, the gap 40 may have a width that is less than a first diameter 42 of the plantlet casings 27, but greater than a second diameter 43 of the plantlet casings 27. In other embodiments, the width of the gap 40 may increase throughout a length 44 of each pair of counter-rotating rods 34 from a first end 45 to a second end 46 (e.g., the width increases moving away from the storage tank 13). In any case, the width of the gap 40 may be less than the first diameter 42 of the plantlet casings 27 to block the plantlet casings 27 from falling between the pair of counter-rotating rods 34. Additionally, a guide may be disposed over each pair of counter rotating rods 34, such that the plantlet casings 27 are directed into a respective gap 40 between a pair of the one or more pairs of counter-rotating rods 34. Accordingly, the plantlet casings may be blocked from falling directly onto a rod of the one or more pairs of counter-rotating rods 34.

As shown in the illustrated embodiment, the one or more pairs of counter-rotating rods 34 are oriented at an angle 47 to a horizontal plane 48 (e.g., parallel to ground 49). For example, the angle 47 may be between approximately 0 to 60 degrees, approximately 0 to 45 degrees, approximately 0 to 30 degrees, or approximately 0 to 15 degrees relative to the horizontal plane 48, which is parallel to the ground 49.

In some embodiments, a rotation rate of the one or more pairs of counter-rotating rods 34 controls the flow rate of material 26 into the air stream 25. Accordingly, the rotation rate of the one or more pairs of counter-rotating rods 34 may be adjusted by a controller 52, which is communicatively coupled to the drive assembly 37, based on a target flow rate of the material 26 into the soil. Additionally, the controller 52 may adjust a speed of the air source 20, such that the air flow 25 is sufficient to meet the target flow rate of material 26 into the soil. Further, a vibration frequency of the hopper 28 may also be adjusted to reach the target flow rate of the material 26 into the soil. In some embodiments, the controller 52 may receive feedback from one or more sensors that are configured to measure parameters of the metering system 18. For example, the controller 52 may receive feedback from a flow sensor 54 disposed in the conduit 22, such that the controller 52 may determine the flow rate of the air stream 25 and adjust the flow rate of the air stream 25 based on the target flow rate of material 26 into the soil.

Additionally, the controller 52 may be coupled to a piezoelectric sensor 56 and/or another sensor that may measure the vibration frequency of the hopper 18. The controller 52 may be configured to adjust the vibration frequency of the hopper 18 (e.g., via the shaker 31) based on the target flow rate of the material 26 into the soil. Further, in some embodiments, the controller 52 may be configured to adjust the rotation rate of the one or more counter-rotating rods 34 based on the flow rate of the air stream 25, the vibration frequency of the hopper 18, and/or the target flow rate of the material 26 into the soil.

As the one or more pairs of counter-rotating rods 34 rotate, a pair of the one or more pairs of counter-rotating rods 34 transfer plantlet casings 27 in the gap 40 between the pair of counter-rotating rods 34 to a receiving portion 58 (e.g., inlet) of a respective inductor 24 of the inductor assembly 23. At the end of the rods, the plantlet casings 27 fall through the receiving portion 58 and are directed into respective conduit(s) 22 associated with a respective row unit or group of row units fluidly coupled to the inductor 24. The plantlet casings 27 are then directed to the respective row unit(s) of the implement through pneumatic conduits via the air flow 25. From the respective row unit(s), the plantlet casing 27 may be disposed into the soil.

FIG. 3 is a perspective view of the singulator 32 of FIG. 2, illustrating operation of the one or more pairs of counter-rotating rods 34, in accordance with embodiments of the present disclosure. As shown in the illustrated embodiment, the singulator 32 includes three pairs of counter-rotating rods 34. In other embodiments, the singulator 32 may include one, two, four, five, six, seven, eight, nine, ten, or more pairs of the counter-rotating rods 34. Each pair of counter-rotating rods 34 includes a first rod and a second rod, in which the first rod rotates in a first direction about a longitudinal axis 69 of the rods (e.g., clockwise or counterclockwise) and the second rod rotates in a second direction about the longitudinal axis 69 of the rods (e.g., clockwise or counterclockwise), opposite the first direction. For example, a rod 70 of the one or more pairs of counter-rotating rods 34 may rotate in a first direction 71, and an adjacent rod 72 of the one or more pairs of counter-rotating rods 34 may rotate in a second direction 73, opposite the first direction 71. Counter-rotation of the pairs of counter-rotating rods 34 may direct the plantlet casings 27 toward the receiving portions 58 of the respective inductors 24 of the inductor assembly 23 in a direction 74.

In the illustrated embodiment, the pairs of counter-rotating rods 34 include grooves 76 and/or protrusions 78 configured to hold the plantlet casings 27 between each pair of counter-rotating rods 34. For example, the grooves 76 and protrusions 78 are spaced along the length 44 of the one or more pairs of counter-rotating rods 34 such that only one of the plantlet casings 27 may fit between adjacent grooves 76 and adjacent protrusions 78. In other embodiments, the one or more pairs of counter-rotating rods 34 may include a screw configuration 79 (e.g., a helical recess) also configured to hold the plantlet casings 27 between a pair of the one or more pairs of counter-rotating rods 34. As shown in the illustrated embodiment, a first pair 80 of the counter-rotating rods 34 may include the grooves 76, a second pair 81 of the counter-rotating rods 34 may include the protrusions 78, and a third pair 82 of the counter-rotating rods 34 may include the screw configuration 79. While the illustrated embodiment, shows the pairs 80, 81, and 82 having the grooves 76, protrusions 78, and screw configuration 79, respectively, it should be noted that the pairs 80, 81, and/or 82 may include the grooves 76, the protrusions 78, the screw configuration 79, or a combination thereof.

Additionally, in the illustrated embodiment, the one or more pairs of counter-rotating rods 34 include guides 83 disposed over certain rods of the one or more pairs of counter-rotating rods 34. The guides 83 are configured to substantially block the plantlet casings 27 from being disposed directly onto adjacent rods of the one or more pairs of counter-rotating rods 34. For example, the guide 83 may cover a the rod 70 of the one or more counter-rotating rods 34 and an adjacent rod 84 of the one or more counter-rotating rods 34. Accordingly, the guide 83 is configured to direct the plantlet casings 27 into the gap 40 between the pairs 81 and 82 of the one or more pairs of counter-rotating rods 34. Disposing the plantlet casings 27 into the gap 40 (e.g., instead of onto adjacent rods of the one or more pairs of counter-rotating rods 34) may ensure that the plantlet casings 27 move toward the receiving portions 58 of the inductor assembly 23 and the plantlet casings 27 do not get stuck on top of adjacent rods of the one or more pairs of counter-rotating rods 34. Additionally, the guides 83 may act to guide the plantlet casings 27 into a specific gap 40, such that a flow rate of the plantlet casings 27 toward the receiving portions 58 is substantially constant (e.g., block plantlet casings 27 from moving from one gap 40 to another gap 40 due to vibrations experienced during movement of the air cart 10).

As shown in the illustrated embodiment, a bottom portion 85 of the storage tank 13 is coupled to the hopper 28. The hopper 28 includes a single compartment 86 that directs the plantlet casings 27 to each pair of counter-rotating rods 34. In other embodiments, the hopper 28 may include multiple compartments, in which each compartment is configured to direct the plantlet casings 27 to a corresponding pair of the one or more pairs of counter-rotating rods 34.

As discussed above, the hopper 28 may vibrate at a frequency that enables the plantlet casings 27 to flow from the storage tank 13 at a substantially constant rate. Vibration of the hopper 28 may be driven by the shaker 31, which may be controlled by the drive assembly 37 or another actuating device. In some cases, the vibration frequency of the hopper 28 may vary due to fluctuations in a signal to the shaker 31, which drives the hopper 28 to vibrate. In some embodiments, the vibration frequency of the hopper 28 may be adjusted to achieve the target flow rate of the material 16 into the soil. In other embodiments, the rotation rate of the one or more pairs of counter-rotating rods 34 may be adjusted by the controller 52 based on feedback received by the controller 52 indicative of the vibration frequency of the hopper 18.

The plantlet casings 27 are directed from the first end 35 of the one or more pairs of counter-rotating rods 34 along the length 44 to the second end 36 of the one or more pairs of counter-rotating rods 34. Each receiving portion 58 is located at or near the second end 36 of a respective pair of counter-rotating rods 34. For example, in the illustrated embodiment, the inductor assembly 23 includes three inductors 24, and thus, three of the receiving portions 58, which correspond to three respective pairs of counter-rotating rods 34. As discussed above, the metering system 18 may include more than three pairs of counter-rotating rods 34. Thus, the inductor assembly 23 of the metering system 18 may include a corresponding number of inductors 24 and receiving portions 58.

As shown in the illustrated embodiment, a first inductor 92 includes a first receiving portion 93 of the receiving portions 58 that directs the plantlet casings 27 into a first conduit 94, which leads to a first row unit or group of row units. Additionally, a second inductor 96 includes a second receiving portion 97 of the receiving portions 58 that directs the plantlet casings 27 into a second conduit 98, which leads to a second row unit or group of row units. Further, a third inductor 100 includes a third receiving portion 101 of the receiving portions 58 that directs the plantlet casings 27 into a third conduit 102, which leads to a third row unit or group of row units. Despite the fact that each of the receiving portions 93, 97, 101 directs the plantlet casings 27 into a separate conduit (and thus to a different row unit or group of row units), a single air source 20 may be utilized to convey the plantlet casings 27 through each of the conduits 94, 98, 102. For example, the air source 20 may direct the air flow 25 through a primary conduit 104 toward a split 106 in the primary conduit 104 that divides the primary conduit 104 into the first conduit 94, the second conduit 98, and/or the third conduit 102. Accordingly, the air flow 25 from the air source 20 may flow into the first conduit 94, the second conduit 98, and the third conduit 102, such that the plantlet casings 27 may be directed from the receiving portions 93, 97, and/or 101 to the first, second, and third row units or groups of row units, respectively. In some embodiments, the air source 20 may be configured to provide sufficient air flow 25 to each of the conduits 94, 98, and 102, such that the plantlet casings 27 are directed through each of the conduits 94, 98, and 102 to the row units substantially simultaneously.

Figure 4:
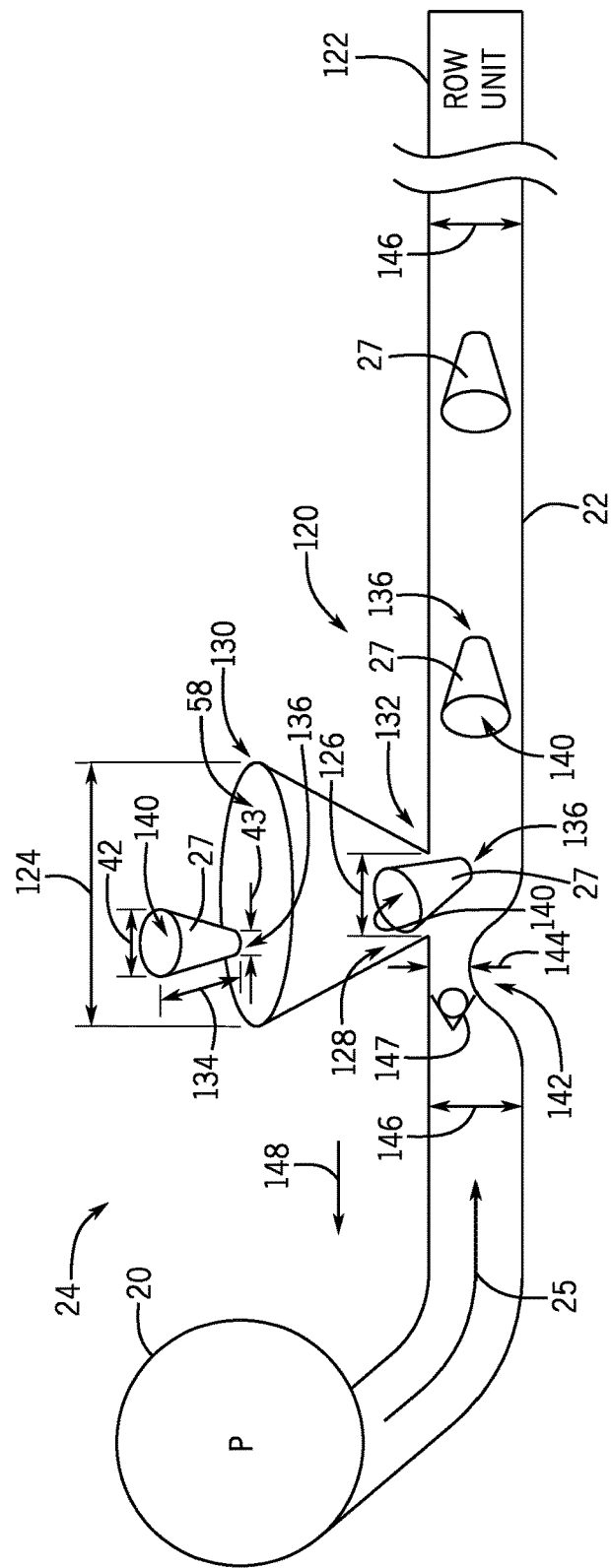
FIG. 4 is a schematic view of an embodiment of an inductor of the metering system of FIG. 2, in accordance with an aspect of the present disclosure.

FIG. 4 is a cross-sectional view of one inductor 24 of the inductor assembly 23, illustrating a path 120 of the plantlet casings 27 from the receiving portion 58 to a row unit 122. For example, the plantlet casings 27 may be gravity fed into the receiving portion 58 (e.g., fall from the second end 36 of a pair of counter-rotating rods 34 into the receiving portion 58 via gravitational force). In the illustrated embodiment, the receiving portion 58 has a first diameter 124 that is greater than the first diameter 42 of the plantlet casings 27, such that the receiving portion 58 may receive the plantlet casings 27.

The receiving portion 58 also includes a second diameter 126 at an aperture 128 in the conduit 22. In some embodiments, the second diameter 126 of the receiving portion 58 may be less than the first diameter 124 of the receiving portion 58, such that the receiving portion 58 guides the plantlet casings 27 from a first end 130 of the receiving portion 58 to a second end 132 of the receiving portion 58 (e.g., the second end 132 is at the aperture 128). For example, the illustrated receiving portion 58 is substantially cone-shaped, such that the receiving portion 58 funnels the plantlet casings 27 into the conduit 22. The second diameter 126 of the receiving portion 58 may be greater than the first diameter 42 of the plantlet casings 27 and a length 134 of the plantlet casings 27, such that the possibility of the plantlet casings 27 blocking the aperture 128 in the conduit 22 is substantially reduced or eliminated. As discussed above, the plantlet casings 27 may have an inverted frustum-shape with a heavier weight on a first end 136. Therefore, the configuration of the plantlet casings 27 may cause the plantlet casings 27 to be oriented substantially vertically with the first end 136 down as the plantlet casings 27 fall through the receiving portion 58. In addition, the configuration of the plantlet casings 27 may cause the plantlet casings 27 to be oriented with the first end 136 in front of a second end 140 with respect to a direction of flow of the plantlet casings 27 along the path 120.

The plantlet casings 27 may be gravity fed from the receiving portion 58 into the conduit 22 (e.g., the plantlet casings 27 fall from the receiving portion 58 and into the conduit 22 via gravitational forces). Once the plantlet casings 27 reach the conduit 22, the air flow 25 directs the plantlet casings 27 along the path 120 toward the row unit 122. The air source 20 may generate a sufficient air flow configured to convey multiple plantlet casings 27 through the conduit 22 (e.g., one, two, three, four, five, six, seven, eight, nine, ten, or more plantlet casings).

As shown in the illustrated embodiment, the conduit 22 includes a physical feature 142 located upstream of the aperture 128 with respect to the path 120 of the plantlet casings 27. In the illustrated embodiment, the physical feature 142 is a portion of the conduit 22 that has a diameter 144 smaller than a diameter 146 of the remainder of the conduit 22. In some cases, the diameter 144 may be less than the first diameter 42 of the plantlet casings 27, such that the plantlet casings 27 are blocked from moving from the aperture 128 toward the air source 20. In the illustrated embodiment, the physical feature 142 also includes a check valve 147 that blocks flow of any material (e.g., plantlet casings, fertilizer, air, etc.) in a direction 148 from the aperture 128 toward the air source 20. In other embodiments, the physical feature 142 may be another valve or restriction disposed along the conduit 22.

FIG. 5 is a flow chart of an embodiment of a process 170 that may be utilized to adjust the vibration frequency of the hopper, the flow rate of the air flow through the conduit, and/or the rotation speed of the one or more pairs of counter-rotating rods. For example, at block 172, the controller may receive inputs indicative of a target flow rate of plantlet casings to soil. In some embodiments, the inputs may include a target spacing between plantlet casings (e.g., a target spacing of the plantlet casings in the soil along the path of the agricultural system), a target speed of the row units or group of row units, and/or a number of row units or group of row units of the implement. Accordingly, the controller may utilize the inputs to determine the target flow rate of plantlet casings to the soil. Additionally, the controller may receive feedback from one or both of the flow sensor and the piezoelectric sensor to determine a measured vibration frequency of the hopper and/or a measured air flow rate through the conduit of the inductor assembly, as shown in block 174. For example, the controller may be communicatively coupled to the piezoelectric sensor and/or the flow sensor, such that the piezoelectric sensor and/or the flow sensor provide feedback to the controller. The controller may then utilize the feedback to determine the measured vibration frequency and/or the measured air flow rate through the conduit of the inductor assembly.

At block 176, the controller may determine a measured rotation speed of the one or more pairs of counter-rotating rods. For example, the controller may be communicatively coupled to a rotation speed sensor (e.g., a reflective sensor, an interrupter sensor, a variable-reluctance sensor, an eddy-current killed oscillator, a Wiegand sensor, a Hall-effect sensor, a tachometer, another sensor configured to measure a rotation speed, or a combination thereof) that monitors the rotation speed of the one or more pairs of counter-rotating rods. The controller may receive feedback from the rotation speed sensor, such that the controller determines the measured rotation speed of the one or more pairs of counter-rotating rods.

Additionally, at block 178, the controller may determine a set point vibration frequency of the hopper, a set point air flow rate through the conduit, and/or a set point rotation speed of the one or more pairs of counter-rotating rods based on the target flow rate of the plantlet casings to soil. For example, the controller may be configured to calculate the set point vibration frequency, the set point air flow rate, and/or the set point rotation speed of the one or more pairs of counter-rotating rods based on the target spacing between plantlet casings, a target speed of the row units or group of row units, and/or a number of row units or group of row units of the implement. In some embodiments, the set point vibration frequency, the set point air flow rate, and/or the set point rotation speed may increase as the target flow rate of the plantlet casings to soil increases. Similarly, the set point vibration frequency, the set point air flow rate, and/or the set point rotation speed may decrease as the target flow rate of the plantlet casings to soil decreases.

At block 180, the controller may adjust the vibration frequency of the hopper, the air flow rate through the conduit of the inductor assembly, and/or the rotation speed of the one or more pairs of counter-rotating rods based on the set point vibration frequency, the set point air flow rate, and/or the set point rotation speed. For example, the controller may send a signal to the shaker, the air source, and/or the drive assembly (e.g., a variable frequency drive) to adjust the vibration frequency, the air flow rate, and/or the rotation speed, respectively. For example, when the measured vibration frequency is greater than the set point vibration frequency, the controller may send a signal to the shaker (e.g., an actuator of the shaker) to decrease the vibration frequency of the hopper. Similarly, when the measured vibration frequency is less than the set point vibration frequency, the controller may send a signal to the shaker (e.g., an actuator of the shaker) to increase the vibration frequency of the hopper. Additionally or alternatively, when the measured air flow rate is greater than the set point air flow rate, the controller may send a signal to the air source to decrease the air flow rate through the conduit of the inductor assembly. Similarly, when the measured air flow rate is less than the set point air flow rate, the controller may send a signal to the air source to increase the air flow rate through the conduit of the inductor assembly. Further still, when the measured rotation speed of the pairs of counter-rotating rods is greater than the set point rotation speed, the controller may send a signal to the drive assembly (e.g., a variable frequency drive) to reduce the rotation speed of the one or more pairs of counter-rotating rods. Similarly, when the measured rotation speed of the pairs of counter-rotating rods is less than the set point rotation speed, the controller may send a signal to the drive assembly (e.g., a variable frequency drive) to increase the rotation speed of the one or more pairs of counter-rotating rods.

While only certain features of the present disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A metering system for an agricultural system, comprising:
    a singulator, comprising:
        a hopper configured to provide a flow of plantlet casings from a storage tank of the agricultural system;
        a pair of counter-rotating rods configured to receive the plantlet casings from the hopper at a feed rate, wherein the pair of counter-rotating rods are spaced apart from one another to form a gap, wherein the gap is configured to receive the plantlet casings and to direct the plantlet casings from a first end of the pair of counter-rotating rods to a second end of the pair of counter-rotating rods, and wherein the gap is formed along a line that intersects a respective rotational axis of each counter-rotating rod of the pair of counter-rotating rods; and
  - a drive assembly configured to drive rotation of the pair of counter-rotating rods.

2. The metering system of claim 1, wherein the gap between the pair of counter-rotating rods has a width less than a maximum diameter of the plantlet casings.

3. The metering system of claim 1, wherein at least one rod of the pair of counter-rotating rods has grooves, protrusions, a helical recess, or a combination thereof, to hold the plantlet casings as the plantlet casings flow along a length of the pair of counter-rotating rods.

4. The metering system of claim 1, wherein a guide is disposed over at least one rod of the pair of counter-rotating rods to block the plantlet casings from falling onto the at least one rod of the pair of counter-rotating rods.

5. The metering system of claim 1, comprising a shaker configured to vibrate the hopper at a vibration frequency, wherein the drive assembly is configured to drive the shaker.

6. The metering system of claim 1, wherein the pair of counter-rotating rods is oriented an angle with respect to a horizontal plane, and the horizontal plane is substantially parallel to a ground plane.

7. The metering system of claim 6, wherein the angle is between 0 and 60 degrees.

8. The metering system of claim 1, wherein the singulator comprises a controller communicatively coupled to the drive assembly, and the controller is configured to adjust a rotation speed of the pair of counter-rotating rods based at least in part on a target flow rate of the plantlet casings to soil.

9. The metering system of claim 8, wherein the controller is configured to determine the target flow rate of the plantlet casings to the soil based at least in part on a target spacing between plantlet casings, a speed relative to the soil of a row unit or a group of row units of the agricultural system configured to receive the plantlet casings from the pair of counter-rotating rods, a quantity of the row units configured to receive the plantlet casings from the pair of counter-rotating rods, or a combination thereof.

10. The metering system of claim 8, wherein the controller is communicatively coupled to a shaker of the hopper and configured to adjust a vibration frequency of the hopper based at least in part on the target flow rate of the plantlet casings to the soil.

11. A metering system for an agricultural system, comprising:
- a singulator, comprising:
  - a pair of counter-rotating rods configured to receive plantlet casings from a storage tank of the agricultural system at a feed rate, wherein the pair of counter-rotating rods are spaced apart from one another to form a gap, wherein the gap is configured to receive the plantlet casings and to direct the plantlet casings from a first end of the pair of counter-rotating rods to a second end of the pair of counter-rotating rods, and wherein the gap is formed along a line that intersects a respective rotational axis of each counter-rotating rod of the pair of counter-rotating rods; and
  - a drive assembly configured to drive rotation of the pair of counter-rotating rods; and
- an inductor, comprising:
  - a receiving portion configured to receive the plantlet casings from the second end of the counter-rotating rods of the singulator;
  - a conduit coupled to the receiving portion and configured to receive the plantlet casings from the receiving portion, wherein the conduit is configured to convey the plantlet casings to at least one row unit; and
  - an air source fluidly coupled to the conduit and configured to provide an air flow through the conduit to convey the plantlet casings to the at least one row unit.

12. The metering system of claim 11, wherein the second end of the counter-rotating rods of the singulator is positioned above the receiving portion relative to a soil surface, such that the plantlet casings are configured to flow from the second end of the counter-rotating rods of the singulator to the receiving portion of the inductor via a gravitational force.

13. The metering system of claim 11, comprising a controller communicatively coupled to one or both of the drive assembly and the air source, wherein the controller is configured to adjust one or both of a rotation speed of the pair of counter-rotating rods and an air flow rate through the conduit based at least in part on a target flow rate of the plantlet casings to soil.

14. The metering system of claim 13, wherein the controller is configured to determine the target flow rate of the plantlet casings to the soil based at least in part on a target spacing between plantlet casings, a speed relative to the soil of the at least one row unit, or a combination thereof.

15. The metering system of claim 13, wherein the singulator comprises a shaker coupled to a hopper configured to provide a flow of the plantlet casings from the storage tank to the pair of counter-rotating rods, the shaker is coupled to the controller, and the controller is configured to adjust a vibration frequency of the shaker based at least in part at least on the target flow rate of the plantlet casings to the soil.

16. The metering system of claim 11, wherein a guide is disposed over at least one rod of the pair of counter-rotating rods to guide the plantlet casings toward the gap.

17. The metering system of claim 11, wherein the gap has a width less than a maximum diameter of the plantlet casings.

18. A metering system for an agricultural system, comprising:
- a singulator, comprising:
    - a plurality of pairs of counter-rotating rods configured to receive plantlet casings from a storage tank of the agricultural system at a feed rate, wherein each pair of counter-rotating rods of the plurality of pairs of counter-rotating rods is spaced apart from one another to form a gap, wherein the gap is configured to receive the plantlet casings and direct the plantlet casings from a first end of the plurality of pairs of counter-rotating rods to a second end of the plurality of pairs of counter-rotating rods, and wherein the gap is formed along a line that intersects a respective rotational axis of each counter-rotating rod of each pair of counter-rotating rods; and
    - a drive assembly configured to drive rotation of at least one pair of counter-rotating rods of the plurality of pairs of counter-rotating rods.

19. The metering system of claim 18, comprising:
- an inductor assembly comprising a plurality of inductors, wherein each inductor of the plurality of inductors, comprises:
    - a receiving portion configured to receive the plantlet casings from a respective pair of the plurality of pairs of counter-rotating rods; and
    - a conduit coupled to the receiving portion and configured to receive the plantlet casings from the receiving portion, wherein the conduit is configured to convey the plantlet casings to a respective row unit or group of row units; and
- an air source fluidly coupled to the conduit of each inductor of the plurality of inductors and configured to provide an airflow through the conduit to convey the plantlet casings to the respective row unit or group of row units.

20. The metering system of claim 19, wherein a first quantity of the plurality of inductors of the inductor assembly corresponds to a second quantity of the plurality of pairs of counter-rotating rods.

* * * * *